United States Patent [19]

Crawford

[11] 3,753,006

[45] Aug. 14, 1973

[54] HIGH SPEED, LOW POWER, DYNAMIC SHIFT REGISTER WITH SYNCHRONOUS LOGIC GATES

[75] Inventor: Robert H. Crawford, Richardson, Tex.

[73] Assignee: Texas Instruments Incorporated, Dallas, Tex.

[22] Filed: Oct. 14, 1970

[21] Appl. No.: 80,786

[62] Division of Ser. No. 685, 238, Nov. 13, 1967, Pat. No. 3,599,010, which is a continuation-in-part of Ser. No. 636, 998, May 8, 1967, abandoned.

[52] U.S. Cl. .................. 307/214, 307/205, 307/213

[51] Int. Cl. .......................................... H03k 19/40

[58] Field of Search ................ 307/205, 214, 221 C, 307/213, 279

[56] References Cited

UNITED STATES PATENTS 3,383,570 5/1968 Lüscher .......................... 307/279 X

*Primary Examiner*—John Zazworsky

*Attorney*—Melvin Sharp

[57] ABSTRACT

A shift register having a plurality of bits each formed by a pair of serially interconnected synchronous inverter stages operated by nonconcurrent clock pulses. Each inverter has an MOS transistor driver, a capacitive load, and a bilateral MOS transistor output. The shift register is in integrated circuit form on the (110) crystallographic plane with the current flow in all transistors in a direction normal to the (110) crystallographic plane. The logic input is the gate of the MOS transistor driver. The clock pulses are sequentially applied to the two inverter stages so that the logic number is shifted through the bit in two steps. Each clock pulse is applied across the load and driver and also is applied to the gate of the output transistor of the respective stage. "Fill," "Clear," and "Recirculate" modes are provided by NAND and NOR logic gates formed in the first bit by connecting two or more MOS transistor drivers for the inverter stages in series or in parallel, respectively. The last stage of the last bit is a unique high speed D.C. buffer capable of driving a highly capacitive circuit external to the shift register at high speed.

4 Claims, 5 Drawing Figures

PATENTED AUG 14 1973

3,753,006

SHEET 1 OF 2

HIGH SPEED, LOW POWER, DYNAMIC SHIFT REGISTER WITH SYNCHRONOUS LOGIC GATES

This is a divisional of application Ser. No. 685,238 filed Nov. 13, 1967, now U.S. Pat. No. 3,599,010 which is a continuation in part of Ser. No. 636,998, filed May 8. 1967, and now abandoned.

This invention relates generally to MOSFET integrated circuits, and more particularly relates to a high speed shift register utilizing capacitively loaded, synchronous logic circuits.

A figure of merit in any logic circuit, whether an inverter, logic gate, binary storage circuit, or shift register, is the product of switching speed and power consumption. Integrated circuits using metal-oxide-semiconductor field effect transistors (MOSFET) have heretofore been used to form two-phase shift registers. In this type of shift register, one MOSFET is used as a load resistor, to limit current, and another as the driver. The size of the load resistor is determined by the speed-power requirements of the circuit. The lower the value of the load resistor, the faster the circuit switches, but the greater the power dissipated. The basic limitation in the speed response of the two-phase shift register is the high value of the load resistor, typically 100,000 ohms, through which the stray circuit capacitance must be charged. An effort has been made to minimize the stray capacitance by reducing the size of the MOS devices. However, the technological state of the photomasking art is a real limitation upon the minimum size of the device, and hence the ultimate switching speed. Silicon devices have heretofore been fabricated on the (111) cyrstallographic plane for various reasons, resulting in a fixed carrier mobility regardless of device orientation. In typical MOSFET integrated circuits, a switching time of one hundred nanoseconds at about one milliwatt is the best combination of rise time and power values obtainable.

In an effort to improve performance, four-phase shift registers have been introduced. In a four-phase system, clocking occurs in such a sequence as to inhibit D.C. current from passing from the voltage supply to ground, in contrast to the conventional two-phase system where D.C. current continually passes through the driver MOSFET to ground when the driver is turned "on." The four-phase system has the advantage of lower power consumption, faster switching speed, and smaller total area in integrated form, but has the disadvantages of requiring at least six MOS transistors per bit and four clock sources with the associated leads. As speed of operation is increased, the generation of the four clock pulses becomes increasingly difficult and is a serious limiting factor on the ultimate speed of the circuit.

The object of this invention is to provide an improved two-phase shift register which utilizes a plurality of serially interconnected, synchronous inverter stages, each shift register bit being formed by two inverter stages. The circuit provides at least an order of magnitude improvement in both speed and power over the conventional two-phase system. In addition, the circuit provides an improved noise margin, greater logic flexibility, permits the use of more of the minimum sized MOSFETs attainable by fabrication technology so that the total area of the shift register is reduced, and requires only two MOS transistors and a load capacitor per inverter function, only four MOS transistors and two capacitors per shift register bit, and only two clock pulses.

These and other objects and advantages are accomplished in accordance with this invention by a shift register comprising a plurality of serially connected bits, each bit comprising first and second inverter stages. Each inverter stage is comprised of a driver MOS transistor and a load capacitance connected in series. An output MOSFET connects the junction between the driver and load to the output of the inverter stage. The output of each inverter stage is connected to the input of the next successive inverter stage. A first pulsed voltage source is applied across the load and driver series circuit of each of the first stages and is applied to the gate of the output transistor of each of the first stages, and a second, noncurrent pulsed voltage source is applied across the load and driver series circuit of each of the second stages and is applied to the gate of the output MOSFET of each of the second stages.

In accordance with another aspect of the invention, the shift register is formed on the surface of a silicon crystal that is substantially parallel to the (110) crystallographic plane and all inversion channels are oriented such that current flow is in a direction normal to the $(\bar{1}10)$ crystallographic plane in order to obtain maximum carrier mobility and maximum switching speed.

The shift register includes, as subcombination components, a synchronous inverter, a synchronous NOR gate formed by connecting two MOS drivers in parallel, and a synchronous NAND gate formed by connecting two driver MOSFETs in series. The shift register also includes an output buffer for driving a highly capacitive load at high speed.

The novel features believed characteristic of this invention are set forth in the appended claims. The invention itself, however, as well as other objects and advantages thereof, may best be understood by reference to the following detailed description of an illustrative embodiment, when read in conjunction with the accompanying drawings, wherein:

Figures 1, 2:
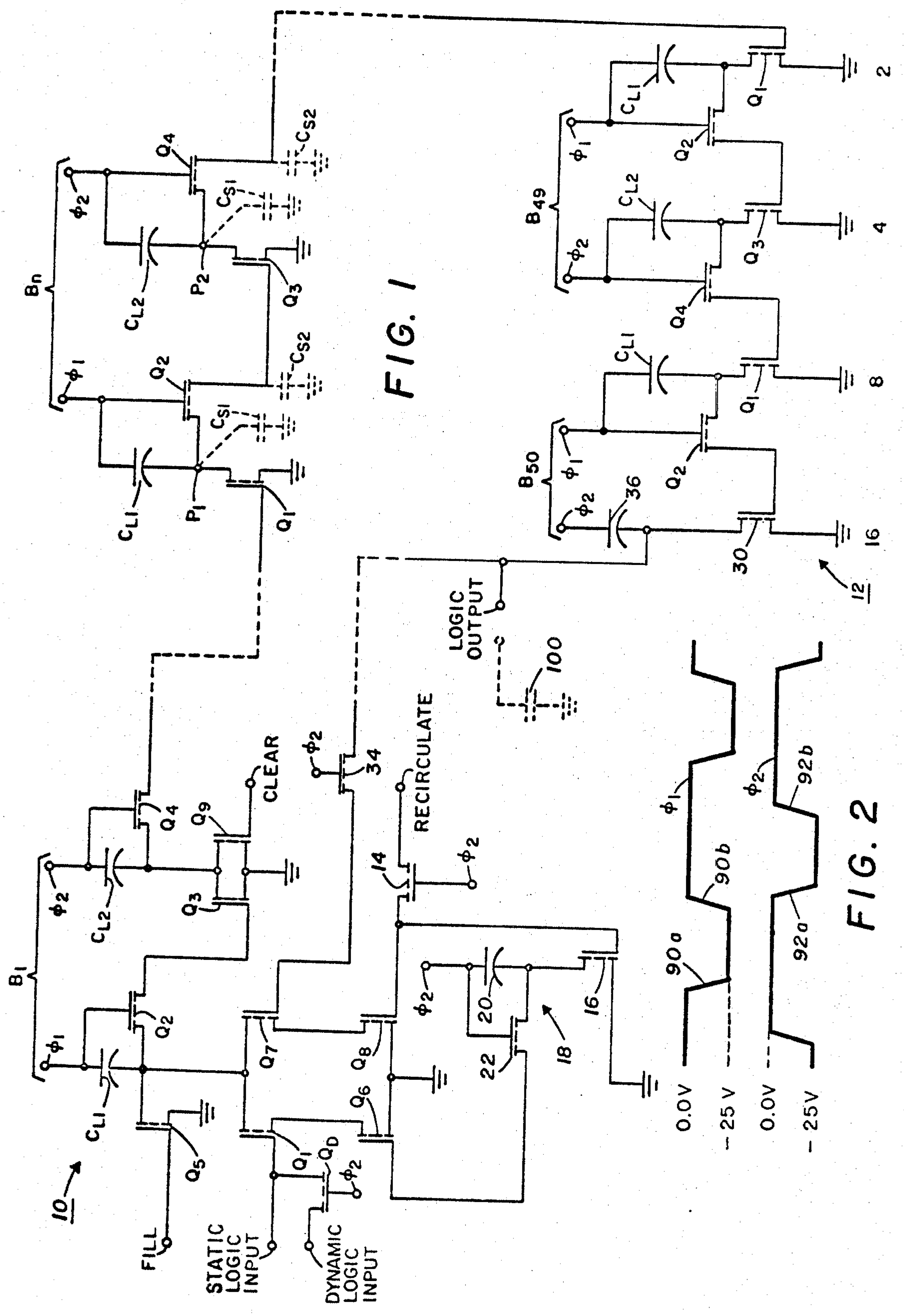
FIG. 1 is a schematic circuit diagram of a shift register constructed in accordance with the present invention.
FIG. 2 is a schematic timing diagram of the two-phase clock source used to operate the shift register of FIG. 1.

Referring now to the drawings, a shift register in accordance with the present invention is indicated generally by the reference numeral 10. In the embodiment illustrated, the shift register has 50 bits, although only the first bit $B_1$, a bit $B_n$ at the end of the row, the 49th bit $B_{49}$ and 50th bit $B_{50}$ are illustrated. Of course, the number of bits is merely a matter of choice. Bit $B_n$ is the most typical and will now be described.

Bit $B_n$ is comprised of first and second identical synchronous inverter stages. The first stage is comprised of a driver MOSFET $Q_1$ and a load capacitance $C_{L1}$ which are connected in series. The gate of the driver transistor $Q_1$ is the logic input of the first inverter stage and therefore of bit $B_n$. An output MOSFET $Q_2$ connects the junction between the load capacitance $C_{L1}$ and the driver $Q_1$ to the output of the first stage. The output of the first stage is connected to the gate of the driver $Q_3$ of the second stage. The driver $Q_3$ is connected in series with a load capacitance $C_{L2}$, and an output MOS transistor $Q_4$ connects the junction between the load capacitance $C_{L2}$ and the driver $Q_3$ to the output of the second inverter stage which may be considered as the output of bit $B_n$. The logic output of each bit is connected to the logic input of the next successive bit as represented by the dotted lines.

The first bit $B_1$ also includes logic circuitry for selectively filling the shift register with logic 1's, clearing the shift register so that it contains no logic 1's, and recirculating the data from the output of the last bit $B_{50}$ to the input of the first bit $B_1$. Thus, the first stage of the first bit $B_1$ includes the driver MOS transistor $Q_1$, the load capacitor $C_{L1}$, and the output MOS transistor $Q_2$, and the second stage includes the driver MOS transistor $Q_3$, the capacitive load $C_{L2}$, and the output transistor $Q_4$, all of which are equivalent to bit $B_n$. A static logic input is connected to the gate of driver $Q_1$ and a dynamic logic input is connected through an MOS transistor $Q_D$ to the gate of driver $Q_1$. In addition, the first stage of bit $B_1$ includes a transistor $Q_5$ which is connected in parallel with the transistor $Q_1$ to provide a "Fill" mode of operation as will hereafter be described in detail. An MOSFET $Q_9$ is connected in parallel with transistor $Q_3$ of the second stage of bit $B_1$ to provide a "Clear" mode of operation. A "Recirculate" mode is provided by transistor $Q_6$, which is connected in series with driver $Q_1$, and transistors $Q_7$ and $Q_8$ which are connected in series, one with the other, but in parallel with transistors $Q_1$ and $Q_6$. A recirculate input is connected by an MOSFET 14 to the gate of transistor $Q_8$, and by a logic inverter indicated generally by the reference numeral 18 to the gate of MOS transistor $Q_6$. The logic inverter 18 is identical to one stage of the bit $B_n$ and includes a driver 16, a load capacitance 20, and an output MOS transistor 22.

Both stages of bit $B_{49}$ and the first stage of bit $B_{50}$ are identical to the stages of bit $B_n$, except for the size of the components, which are enlarged for purposes which will hereafter be described in connection with the operation of the circuit. The second inverter stage of the last bit $B_{50}$, however, is an output buffer 12. The output buffer includes capacitor 36 which is connected in series with the driver transistor 30 and which may be external to the integrated circuit if desired. The junction between transistor 30 and capacitor 36 is the output of the buffer and therefore the output of the shift register. An MOS transistor 34 connects the output of the buffer back to the gate of transistor $Q_7$ of the first stage of bit $B_1$ to provide a recirculate mode as will hereafter be described.

The noncurrent clock pulses $\phi_1$ and $\phi_2$ shown in FIG. 2 supply power to the inverters of the shift register. Clock pulses $\phi_1$ are applied to all of the terminals designated 100 $_1$, and clock pulses $\phi_2$ are applied to all of the terminals designated $\phi_2$. It will be noted that the first clock pulse $\phi_1$ is applied across the load capacitance $C_{L1}$ and the driver $Q_1$ of the first stage of each bit, and to the gate of the output transistor $Q_2$ of the first stage of each bit. The second clock pulse $\phi_2$ is applied across the series circuit including the load capacitance $C_{L2}$ and the driver $Q_3$ of each second stage, and to the gate of the output transistor $Q_4$ of each second stage. Clock pulse $\phi_2$ is also applied to the gate of transistor 14 of the recirculate circuitry, to the inverter 18, to the output buffer 12, and to the dynamic input MOSFET $Q_D$.

Figure 3:
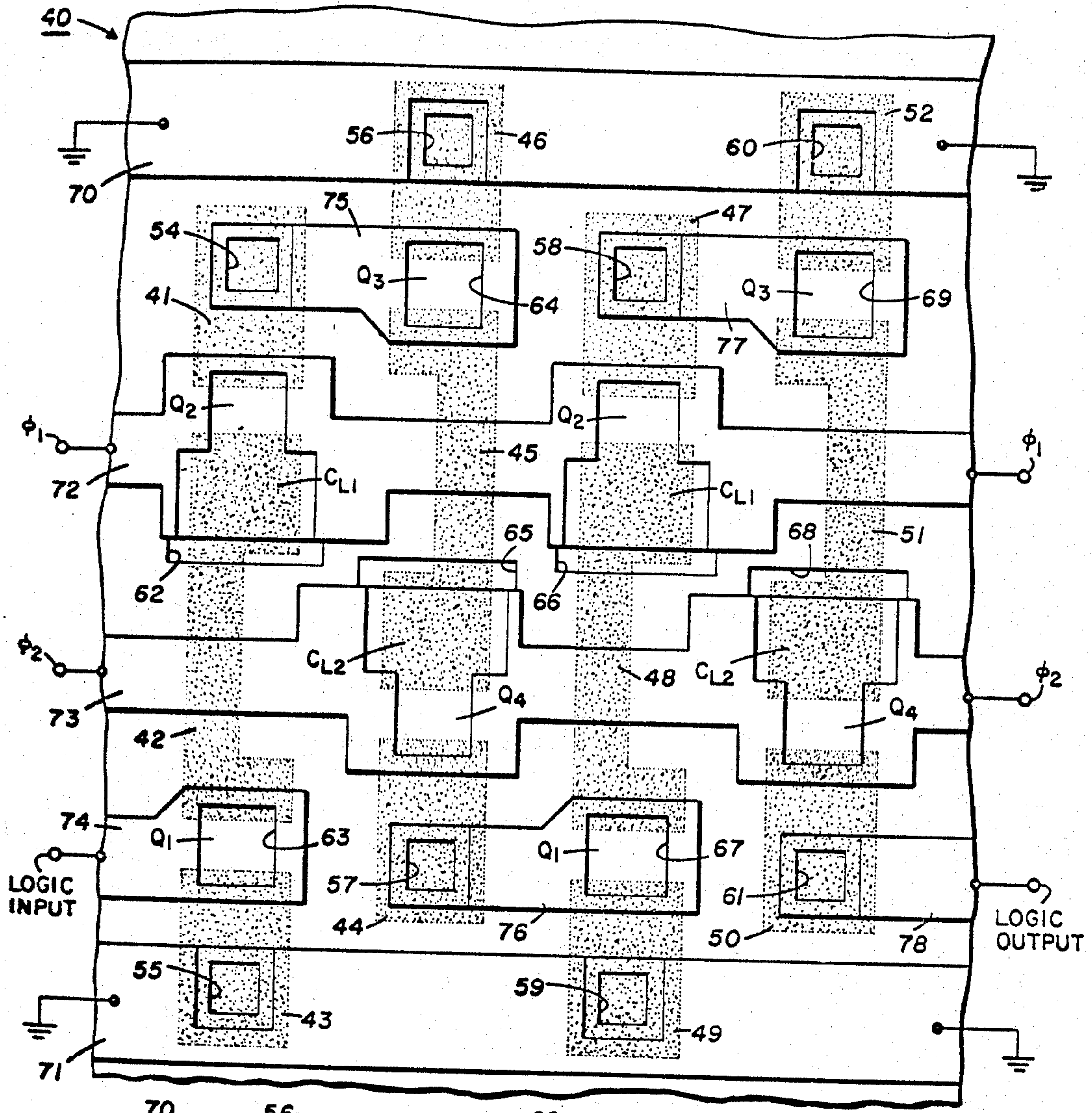
FIG. 3 is a top view of two bits of the shift register illustrated in FIG. 1 fabricated in integrated circuit form.

Referring now to FIG. 3, a portion of an integrated circuit embodying two bits of the phase shift network 10 is indicated generally by the reference numeral 40. The integrated circuit 40 is typically formed on a surface of n-type silicon parallel to the (110) crystallographic surface (as defined by the Miller index system) into which a single p-type diffusion is made in the stippled areas 41–52. An oxide layer is formed over the entire surface of the semiconductor substrate except in areas 54–61. The silicon dioxide layer is typically about 15,000 angstroms thick everywhere except in the areas 62–69 where active MOS transistors or MOS capacitors are to be formed where the oxide is only about 1,000 angstroms thick. In addition, the oxide is only about 1,000 angstroms thick around each of the openings 54–61 due to the fabrication process. A metallized layer, typically aluminum, is deposited over the surface of the oxide and over the exposed surface of the substrate and then patterned to form ground leads 70 and 71, clock leads 72 and 73 for clock pulses $\phi_1$ and $\phi_2$, respectively, and interconnections 74–78.

The channel of driver $Q_1$ of the first bit is thus formed between diffused regions 42 and 43 under the thin oxide area 63, with the overlapping portion of metal interconnection 74 forming the gate. Diffusion 42 forms one plate of the load capacitance $C_{L1}$, the thin oxide in area 62 forms the dielectric, and the metal lead 72 forms the other plate. The channel of output transistor $Q_2$ is formed between diffused regions 41 and 42 under the thin oxide in area 62, and metal lead 72 forms the gate. Ground lead 71 is in ohmic contact with diffused region 43 through opening 55 in the oxide layer, and interconnection 75 is in ohmic contact with diffused region 41 through opening 54 in the oxide. The other end of interconnection 75 forms the gate of transistor $Q_3$. It should be noted that the diffused regions forming the source and drain of each MOSFET are oriented such that current flows only in the vertical direction, when referring to FIG. 3, although the current may flow upwardly or downwardly. As previously mentioned, the devices are formed on a surface of the silicon crystal that is parallel to the (110) crystallographic plane. The circuit is also oriented on the slice such that current flowing between source and drain on the thin, p-type inversion layer beneath the respective gates will flow normal to the $(\bar{1}10)$ crystallographic plane, i.e., in the $[\bar{1}10]$ direction. This orientation utilizes the greatest carrier mobility available in silicon, as described in copending U. S. application Ser. No. 684,413, entitled "Inversion Layer Semiconductor Device With Azimuthally Dependent Carrier Mobility, " filed on behalf of Jack P. Mize on Nov. 8, 1967 by the assignee of the present invention and now U.S. Patent No. 3,476,991, issued Nov. 4, 1969, and achieves the fastest possible switching speed as will hereafter be described in greater detail. This circuitry is repeated for each of the three successive inverter stages of the shift register shown in FIG. 3.

Figure 4:
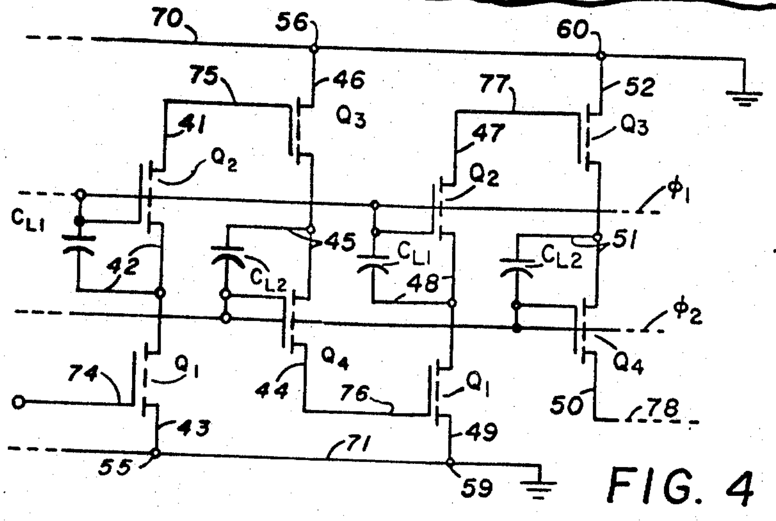
FIG. 4 is a schematic circuit diagram of that portion of the shift register shown in FIG. 3.

The schematic circuit shown in FIG. 4 is equivalent to two successive bits of the shift register 10 of FIG. 1. However, in FIG. 4 the components are arranged in substantially the same manner as the components of the integrated circuit 40, and the various components of the schematic of FIG. 4 are designated by the same reference characters used to designate the corresponding components in the integrated circuit 40 of FIG. 3.

Operation

In the operation of the shift register 10, the typical logic 0 level is 0.0 volt and the typical logic 1 level is -12.0 volts. The clock pulses $\phi_1$ and $\phi_2$ typically fall from 0.0 volt to −25.0 volts. The threshold voltage of the MOS transistors is typically −3.0 to −5.0 volts.

The operation of the shift register 10 can best be understood by reference to the typical bit $B_n$ in FIG. 1. Assume that a logic 0 level of 0.0 volt is applied to the gate of driver $Q_1$ prior to the fall 90*a* of clock pulse $\phi_1$. Since no potential is applied across the load capacitor $C_{L1}$, the capacitance and the stray capacitance $C_{S1}$ of the circuit are discharged. When clock voltage $\phi_1$ falls at 90*a* at a high rate, typically 10 to 50 nanoseconds, node $P_1$ goes negative at substantially the same rate because the gate of driver $Q_1$ was assumed to be at 0.0 volt and is therefore turned "off" and the stray capacitance $C_{S1}$ is directly charged. The load capacitance $C_{L1}$ and the stray capacitance $C_{S1}$ form a capacitor voltage divider. When the voltage on the gate of output transistor $Q_2$ reaches the threshold voltage, the output transistor turns "on" so that the voltage at node $P_1$ is transferred to the stray capacitance $C_{S2}$ through the very low resistance of transistor $Q_2$. The stray capacitance represented by $C_{S2}$ is the stray capacitance of the PN-junction of output transistor $Q_2$ and the capacitance of the gate of the driver transistor $Q_3$ of the second inverter stage. During the rise 90*b* of the first clock pulse $\phi_1$, output transistor $Q_2$ turns "off" so that the voltage charge on stray capacitance $C_{S2}$ is trapped at a level typically on the order of about −10.0 to −12.0 volts. The gate of the driver transistor $Q_3$ of the second stage is then biased below its threshold level so that it will turn "on" during the fall 92*a* of the clock pulse $\phi_2$. Thus, as clock pulse $\phi_2$ falls, node $P_2$ remains substantially at ground potential. As output transistor $Q_4$ is turned "on" during clock pulse $\phi_2$, any charge on stray capacitance $C_{S2}$ from the previous cycle is discharged so that a logic 0 is applied to the input of the next successive bit.

On the other hand, if the gate of driver $Q_1$ is at a logic 1 level of about −12.0 volts prior to clock pulse $\phi_1$, transistor $Q_1$ is biased "on" during clock pulse $\phi_1$ so that node $P_1$ remains substantially at zero potential and stray capacitance $C_{S2}$ of the first stage is discharged while transistor $Q_2$ is "on". Transistor $Q_3$ then remains "off" during clock pulse $\phi_2$ so that stray capacitance $C_{S2}$ of the second stage is charged negatively to a logic 1 level. Thus, in two clock pulses, i.e., one clock cycle, either a logic 1 or a logic 0 is shifted from the input to the output of the bit.

The first bit $B_1$ operates in the same manner as bit $B_n$, provided the "Fill", "Clear", and "Recirculate" inputs are all at a logic 0 level. Under those conditions, transistor $Q_5$ is turned "off" and has no effect upon bit $B_1$, transistor $Q_8$ is turned "off" to disable transistor $Q_7$ so that the output from the last bit $B_{50}$ has no effect, and transistor $Q_6$ is turned "on" to enable logic input transistor $Q_1$. Transistor $Q_0$ is also turned "off" and has not effect. The static logic input may be used where a prolonged logic level is available, or the dynamic logic input may be used in which case the logic level existing at the dynamic input is sampled during clock pulse $\phi_2$ and stored on the gate of MOS driver $Q_1$ preparatory to clock pulse $\phi_1$. Thus, a logic 0 at the logic input keeps transistor $Q_1$ "off" during clock pulse $\phi_1$ so that a negative charge is applied to the gate of driver $Q_3$ of the second stage. Then during clock pulse $\phi_2$, driver $Q_3$ conducts so that a logic 0 is applied to the input of bit $B_2$ (not illustrated) before the next clock pulse $\phi_1$. The converse occurs when the logic input is at a logic 1 level. Thus, the logic numbers are sequentially shifted through the successive bits $B_1$–$B_{50}$, shifting one bit position for each two-phase clock cycle.

The last bit $B_{50}$, which includes the buffer 12 as its last stage, operates in substantially the same manner, except that it has the capability of supplying substantially more output current to drive a highly capacitive external load circuit 100. Thus, if a logic 1 is applied to the gate of driver $Q_1$ of the first stage of bit $B_{50}$, a logic 0 level is applied to the gate of transistor 30 after clock pulse $\phi_1$. As clock pulse $\phi_2$ falls, the capacitive load 100 is charged through capacitor 36 and transistor 34 at substantially the same rate as the fall of clock pulse $\phi_2$. The ultimate voltage at the output is determined by the relative size of capacitance 36 and the load capacitance 100. If the capacitance of the external circuit is large, the capacitance 36 may be external to the integrated circuit.

The information stored in the shift register can be recirculated by raising the "Recirculate" input to a logic 1 level. The output of bit $B_{50}$ is connected to the gate of transistor $Q_7$ of the first stage of bit $B_1$ by transistor 34 so that during clock pulse $\phi_2$ transistor 34 turns "on" and the logic level at the output of the bit is stored on the gate of transistor $Q_7$. Also during the clock pulse $\phi_2$, transistor 14 is turned "on" and the gate of transistors $Q_8$ and $Q_{16}$ are charged negatively to a logic 1 level. Since the input to inverter 18 is a logic 1 level, transistor 16 is turned "on" during clock pulse $\phi_2$, thus discharging the gate of transistor $Q_6$. This preconditions the first stage of the first bit by disabling the logic input transistor $Q_1$ by turning transistor $Q_6$ "off", and enabling transistor $Q_7$ by turning transistor $Q_8$ "on". After clock pulse $\phi_2$, transistors 14 and 22 turn "off", storing the logic 1 level at the gate of transistor $Q_8$ and a logic 0 level at the gate of transistor $Q_2$. Then during the next clock pulse $\phi_1$, the logic level at the output of the buffer 12 during the last clock pulse $\phi_2$ that was stored on the gate of transistor $Q_7$ will determine the output of the first inverter stage of bit $B_1$ in the same manner as heretofore described. Thus, by maintaining the recirculate logic input at a logic 1 level for fifty clock cycles, the information stored in the shift register can be recirculated to the exclusion of data at the logic input of bit $B_1$.

The entire register can be filled with logic 1's by applying a logic 1 level to the "Fill" input for 50 clock cycles. In that case, the output of the first stage of bit $B_1$ will always be a logic 0, and the output of the second stage of bit $B_1$ always a logic 1, without regard to the state of the "Logic Input" to the gate of transistor $Q_1$, or the state of the "Recirculate" input. Similarly, the shift register can be cleared, i.e., filled with logic 0's, by raising the "Clear" input to a logic 1 level to turn transistor $Q_9$ "on". Then the output of the second stage of bit $B_1$ will always be a logic 0, regardless of the output of the first stage.

It will be noted that the "Clear" mode of operation overrides the other three modes, the "Fill" mode overrides the "Recirculate" mode and the "Logic Input"

mode, and that the "Recirculate" mode overrides the "Logic Input" mode.

It will also be noted that the basic synchronous inverter circuit can be modified to form a synchronous NAND gate by connecting two driver MOS transistors in series, and a synchronous NOR gate by connecting two driver MOS transistors in parallel. Of course, synchronous AND and synchronous OR gates can be formed by adding an inverter stage to the NAND and NOR gates, respectively. Since the circuits are synchronous and have a storage capability, the circuits may also be used to form binary storage elements, i.e., flipflops, by crosscoupling the gates in the conventional manner. Thus, all logic functions can be performed using the basic inverter circuit.

The switching time of the circuit of this invention is at least an order of magnitude faster than the switching time of conventional two-phase systems. In conventional two-phase systems, the resistive load normally used in place of the capacitive load must provide a resistance approximately 10 times greater than the resistance of driver transistor $Q_1$ when biased "on". This resistance in conjunction with the stray capacitance of the circuit forms an RC time constant which limits the switching time to about 100 nanoseconds. In the circuit illustrated, however, point $P_1$ essentially follows the clocking pulse and this is transferred to the stray capacitance $C_{S2}$ at a rate determined by the resistance of transistor $Q_2$ when switched "on" and the size of the stray capacitance $C_{S2}$. The greatest switching time required is actually determined by the time required to discharge capacitances $C_{S1}$ and $C_{S2}$ through the resistance offered by transistors $Q_1$ and $Q_2$ when the transistors are turned "on". The circuit of this invention dissipates at least an order of magnitude less power than conventional two-phase circuits because current flows only during the fall and rise periods of the clock pulses. The switching speed of the shift register is improved by a factor of about 1.4 as a result of fabricating the circuit on the (110) crystallographic plane of the silicon with all devices carefully oriented on the surface such that current flows only in a direction normal to the $(\bar{1}00)$ crystallographic plane.

The shift register 10 has a substantially improved noise margin because with no current flowing through transistor $Q_1$, the logic 0 output is truly ground potential becuase there is no voltage drop across the driver transistor $Q_1$ in the absence of current flow. Thus, if the threshold voltage of the driver transistor $Q_3$ is −5.0 volts, which is a typical value, a noise spike of 5.0 volts is required to spuriously trigger transistor $Q_3$ "on". This compares with a noise margin of from 2.0 to 3.0 volts in a conventional two-phase shift register circuit. Since there is no current flowing, the driver transistors for the bits other than the first and last may be the minimum size permitted by fabrication technology without affecting the noise margin. Also, a number of the drivers of minimum size can be connected in series to perform a NAND function without affecting the noise margin. This permits greater flexibility in logic as is demonstrated by bit $B_1$. Only two active transistors are required for an inverter, and one additional transistor for each additional logic function. Only four active transistors are required per shift register bit. In addition, all of the advantages of a conventional four-phase system are provided using only two clock pulses, thus reducing the number of leads in the circuit, and reducing the complexity of the clock pulse generators for a particular high frequency. The circuit can be operated at substantially higher frequencies, typically 10 MHz as compared to 1–2 MHz for prior two-phase systems and 5 MHz for prior four-phase systems. Although there is no apparent advantage in doing so, the shift register can be operated using either a three-phase of a four-phase clock system.

The transistors of the standard bits may be the minimum size permitted by the state of the fabrication technology. However, if the width of a driver of a standard bit is taken as unity, the widths of the channels of the transistors and the area of the load capacitor of the last stage of the last bit in each rows are increased by a factor of two in order to charge the increased stray capacitance $C_{S2}$ resulting from the increased length of the interconnecting metal layer to the next row of bits of an integrated structure. Similarly, the corresponding values of the first and second stages of bit $B_{49}$ and the first stage of bit $B_{50}$ and the output buffer are each increased by a factor of two over the preceding stage in order to drive the highly capacitive load 100 at the same high speed. If the discharge rate through transistors $Q_1$ and $Q_6$, for example, is too slow, the widths of the transistors can also be increased.

The capacitor 36 of the output buffer provides a means for very rapidly charging the capacitance of the circuit driven by the shift register, and transistor 30 must be oversized to permit discharge of the capacitance of the load and to sink the transient current through large capacitor 36. It will be noted that the logic level at the output exists only during clock pulse $\phi_2$ so that any circuitry using the logic level must do so during clock pulse $\phi_2$. The dynamic input transistor $Q_D$ provides a means for sampling and storing the logic level at the output of another identical shift register, for example.

Figure 5:
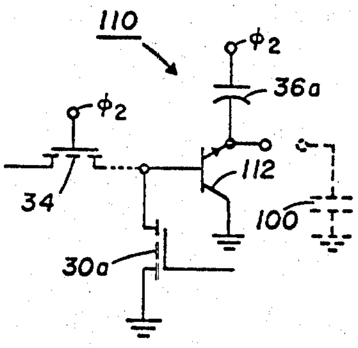
FIG. 5 is a schematic circuit diagram of another output buffer which can be used in the shift register of FIG. 1.

An alternative output buffer which may be used in the shift register 10 is indicated generally by the reference numeral 110 in FIG. 5. The buffer 110 uses MOS transistor 30*a* which corresponds to transistor 30 of the buffer shown in FIG. 1. The base of a conventional bipolar NPN transistor 112 is connected to the drain of MOS transistor 30*a*, the collector is connected to ground, and the emitter is connected through a capacitor 36*a* to the second clock pulse source $\phi_2$. The emitter of transistor 112 forms the output which drives the external load 100.

Assume first that a logic 0 level is applied to the gate of transistor 30*a*. At the fall of clock pulse $\phi_2$, capacitor 36*a* and load capacitor 100 will follow the fall of the pulse and be immediately charged so that the emitter of transistor 112, and thus the output, will assume a potential of about −12.0 volts. The base of transistor 112 will be approximately 0.7 volt more positive, or about −11.3 volts. Thus, a logic 1 level is produced at the output of the buffer and also is passed through MOS transistor 34*a* to the gate of MOS transistor $Q_7$. On the other hand, when the gate of transistor 30*a* is at a logic 1 level prior to clock pulse $\phi_2$, the base of transistor 112 is held essentially at ground potential so that its output goes only to about −0.7 volt during the negative going clock pulse $\phi_2$.

Because of the current gain of transistor 112, MOS transistor 30*a* need supply only base current to transistor 112, and thus can be made much smaller than the MOS transistor 30 in the output buffer of FIG. 1. As previously mentioned, capacitor 36 may be external of the integrated circuit and may be selected to match the capacitance 100 of the load. The conventional bipolar transistor 112 may be formed integral with the integrated circuit, may be a chip mounted on the integrated circuit, or may be external of the integrated circuit.

Although a preferred embodiment of the invention has been described in detail, it is to be understood that various changes, substitutions, and alterations can be made therein without departing from the spirit and scope of the invention as defined by the appended claims.

What is claimed is:

1. A synchronous logic integrated circuit inverter comprising:

a driver MOS transistor and a load capacitance connected in series across a pulsed voltage source, the gate of the driver MOS transistor being the logic input of the inverter, and an output MOS transistor connecting the junction between the driver MOS transistor and the load capacitance to the output of the inverter, the gate of the output MOS transistor being connected to the pulsed voltage source wherein said driver and output MOS transistors are disposed on a (110) crystallographic surface of monocrystalline silicon such that current flow through the channels of the MOS transistors is normal to the $(\bar{1}10)$ crystallographic plane.

2. A high speed inverting output buffer comprising a series circuit comprising an MOS transistor and a capacitance interconnected by the base-emitter circuit of a bipolar transistor, the series circuit being connected across a pulsed voltage source, the gate of the MOS transistor being the logic input, the base of the bipolar transistor being connected to the MOS transistor, and the emitter being connected to the capacitance, and the collector being connected to a collector supply voltage, the emitter being the logic output of the buffer.

3. The high speed inverting output buffer of claim 2 wherein the buffer is an integrated circuit.

4. The high speed inverting output buffer of claim 2 wherein said MOS and bipolar transistors are integrated circuit transistors, and said capacitance is a discrete capacitor external to the integrated circuit.

* * * * *